United States Patent Office 3,144,474
Patented Aug. 11, 1964

3,144,474
PURIFICATION PROCESS FOR ISOCYANATES
Tadeusz Antoni Kantyka and Clifford Toyne, Manchester, England, assignors to Imperial Chemical Industries Limited, London, England, a corporation of Great Britain
No Drawing. Filed May 23, 1960, Ser. No. 30,766
Claims priority, application Great Britain June 12, 1959
1 Claim. (Cl. 260—453)

This invention relates to an improved process for purifying the crude isocyanates obtained by phosgenating primary amines.

It is well-known to prepare organic isocyanates by interacting primary amino compounds with phosgene in presence of an inert solvent and isolating the isocyanate by distillation from the crude product so obtained. The crude product of phosgenation contains polymeric substances such as isocyanurates and other high boiling impurities such as polyureas and biurets. These impurities may comprise as much as 25% by weight of the isocyanate produced and have hitherto proved both troublesome and expensive to eliminate. Thus if the crude mixture is fractionally distilled the non-volatile residue remaining in the still is difficult to remove and dispose of and the recovery of isocyanate is low. It is also known that good recovery of isocyanate can be only obtained if these polymeric impurities are first eliminated, e.g by flash distillation, but flash distillation is not always convenient or economic.

According to the present invention we provide a process for eliminating impurities from crude organic isocyanates obtained by phosgenating primary amines in presence of insert solvents as hereinafter defined which comprises mixing the crude organic isocyanate and inert solvent in which it is dissolved with a petroleum fraction and removing precipitated impurities from the mixture.

As inert solvents in which the phosgenation is to be performed we include any solvent capable of dissolving the amine employed as starting material and also the derived isocyanate and which is unaffected chemically by the phosgenation process. Phosgenation is usually carried out at temperatures of from 0° C. to 160° C. and it is advantageous to employ inert solvents as reaction media which do not boil below these temperatures. Particularly suitable inert solvents are for example chlorinated aromatic hydrocarbons such as o-dichlorobenzene.

As petroleum fractions any liquid hydrocarbon fraction obtained during the distillation or cracking of crude petroleum which contains a substantial proportion of paraffinic hydrocarbons and has a suitable boiling point range to facilitate separation from isocyanate and the inert solvent by fractional distillation may be used, as for example petroleum ether, kerosene or paraffin oils.

The amount of polymeric bodies precipitated depends on the concentration of the isocyanate in the crude isocyanate solution and on the amount of petroleum fraction employed. The higher the amount of isocyanate present in the crude isocyanate solution the smaller is the quality of petroleum fraction required to affect the precipitation of impurities. In order to reduce the usage of petroleum fraction, the crude isocyanate solution may be concentrated by distilling off some of the inert solvent until the remaining solution contains about 30 to 40% isocyanate, 2 to 5 parts of petroleum fraction per part of 100% isocyanate present in the crude concentrated isocyanate solution are then usually sufficient to precipitate practically all the polymeric bodies. When such a concentration process is employed before addition of the petroleum fraction, care must be taken not to carry the concentration process too far as there is then a danger that some isocyanate may also separate with the residue precipitated by addition of the petroleum fraction. The upper limit of isocyanate concentration depends on the nature of the inert solvent in which the phosgenation is conducted. For o-dichlorobenzene the practicable upper limit of crude isocyanate concentration is about 60%.

The polymeric bodies precipitated by addition of the petroleum fraction can be removed from the mixture by filtration, centrifuging or sedimentation and the isocyanate recovered from the filtrate by fractional distillation. A small amount of fluid residue normally left behind in the still can be recycled.

The process may be employed for purifying a wide range of mono-, di-, tri- and high-isocyanates and is especially useful for purifying aromatic isocyanates such as tolylene diisocyanate and diphenylmethane diisocyanate.

The invention is illustrated but not limited by the following examples in which parts and percentages are by weight.

*Example 1*

290 parts of crude tolylenediisocyanate solution, as obtained by phosgenation of tolylenediamine, containing 87 parts of tolylene diisocyanate (approximate isomer ratio 80% 2:4-/20% 2:6-) and 203 parts of o-dichlorobenzene were mixed with 432 parts of petroleum spirit B.P. 115–125° C. A solid precipitate was formed immediately. The mixture was agitated for 1 hour, filtered and the residue washed with a small amount of petroleum spirit. The amount of dry residue collected was 7.02 parts, equivalent to 7.7 parts per 100 parts of tolylene diisocyanate. The filtrate contained 98.5 parts of the original isocyanate. The filtrate was fractionated and 97.5% of the isocyanate recovered.

When the crude tolylene diisocyanate solution was fractionated without preliminary addition of petroleum spirit only 87% of the isocyanate present was recovered.

*Example 2*

150 parts of crude tolylene diisocyanate solution, as that used in Example 1, containing 50 parts of tolylene diisocyanate and 100 parts of o-dichlorobenzene were mixed separately with various quantities of petroleum spirit, B.P. range 100–120° C. In each case a solid precipitate was formed immediately. The mixtures were agitated for approximately ½ hour, filtered and the residue washed with a small amount of petroleum spirit. The results are summarised in the following table.

| Experiment No. | Crude Isocyanate Solution, parts | Petroleum Spirit, parts | Dry residue, parts/100 parts 100% isocyanate |
|---|---|---|---|
| 1 | 150 | 100 | 5.8 |
| 2 | 150 | 150 | 7.8 |
| 3 | 150 | 200 | 8.2 |

The crude isocyanate solution employed in the above experiments originally contained 8.3 parts of polymeric bodies for 100 parts of 100% isocyanate.

When the filtrate from Experiment No. 3 was fractionated 95% of the isocyanate present in the original crude solution was recovered, as compared with a recovery of only 87% when the crude isocyanate solution was fractionated without preliminary treatment.

What we claim is:

A process for eliminating isocyanurate, polyurea and biuret impurities from a solution of 30–60% of a crude isocyanate selected from the group consisting of diphenylmethane diisocyanate and toluylene diisocyanate, together with said impurities in a liquid chlorinated aromatic hydrocarbon, said solution being obtained by phosgenating a member of the group consisting of diamino toluene and diamino diphenylmethane in the presence of said chlorinated aromatic hydrocarbon, said process comprising mixing the crude aromatic isocyanate and chlorinated aromatic hydrocarbon with a liquid hydrocarbon petroleum fraction having a lower boiling point than said chlorinated aromatic hydrocarbon in an amount of 2–5 parts of petroleum fraction per part of 100% isocyanate present in the crude isocyanate solution whereby said impurities are caused to precipitate and separating the precipitated impurities from the mixture of chlorinated aromatic hydrocarbon and isocyanates.

References Cited in the file of this patent

UNITED STATES PATENTS

| | | |
|---|---|---|
| 2,379,948 | Burgoine | July 10, 1945 |
| 2,680,128 | Slocombe et al. | June 1, 1954 |
| 2,683,160 | Irwin | July 6, 1954 |
| 2,884,362 | Bloom et al. | Apr. 28, 1959 |
| 2,969,386 | McElroy | Jan. 24, 1961 |